United States Patent [19]

Gartmann et al.

[11] 4,290,888
[45] Sep. 22, 1981

[54] STRAINER

[76] Inventors: Hans H. Gartmann; Achim K. Gartmann, both of 3900 Hicks Rd., Sebastopol, Calif. 95472

[21] Appl. No.: 124,782

[22] Filed: Feb. 26, 1980

Related U.S. Application Data

[63] Continuation-in-part of Ser. No. 16,328, Feb. 27, 1979, abandoned.

[51] Int. Cl.³ .............................................. B01D 33/00
[52] U.S. Cl. .................................... 210/356; 210/435; 210/474; 210/499
[58] Field of Search ............... 210/356, 435, 455, 459, 210/460–465, 470–474, 481–483, 495, 497 R, 499, 500 R

[56] References Cited

U.S. PATENT DOCUMENTS

| | | | |
|---|---|---|---|
| 1,046,881 | 10/1912 | Smith | 210/482 |
| 1,599,835 | 9/1926 | Nelson | 210/474 X |
| 3,414,129 | 12/1968 | Going et al. | 210/356 X |
| 3,727,435 | 4/1973 | Menk | 210/356 X |
| 3,919,089 | 11/1975 | Ganzolez | 210/499 X |

Primary Examiner—Ernest G. Therkorn
Attorney, Agent, or Firm—Flehr, Hohbach, Test, Albritton & Herbert

[57] ABSTRACT

A strainer for use with materials such as paint and having a funnel shaped polypropylene body with a stainless steel wire screen bonded to the narrow opening thereof. The screen has a sufficiently small mesh to permit passage of normal paint particles but to prevent passage of dust and other undesirable particles. The mesh is made sufficiently large to permit flexure such as to prevent the accumulation of paint.

8 Claims, 2 Drawing Figures

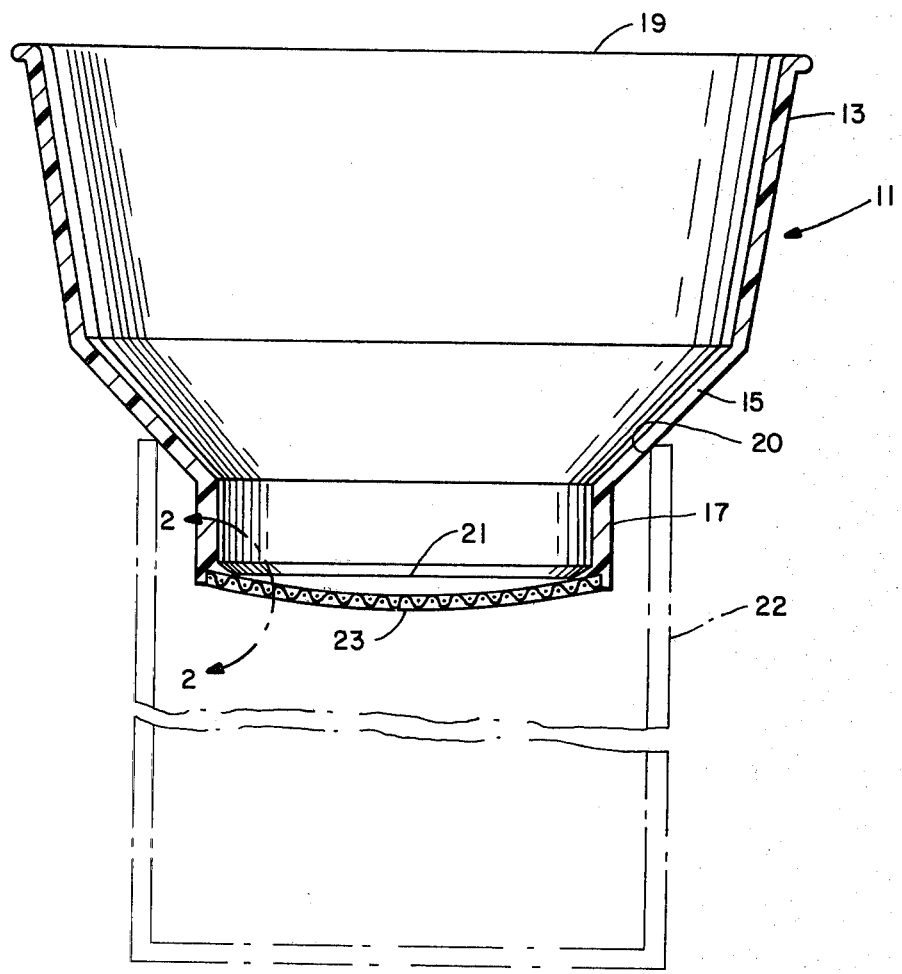
FIG.—1
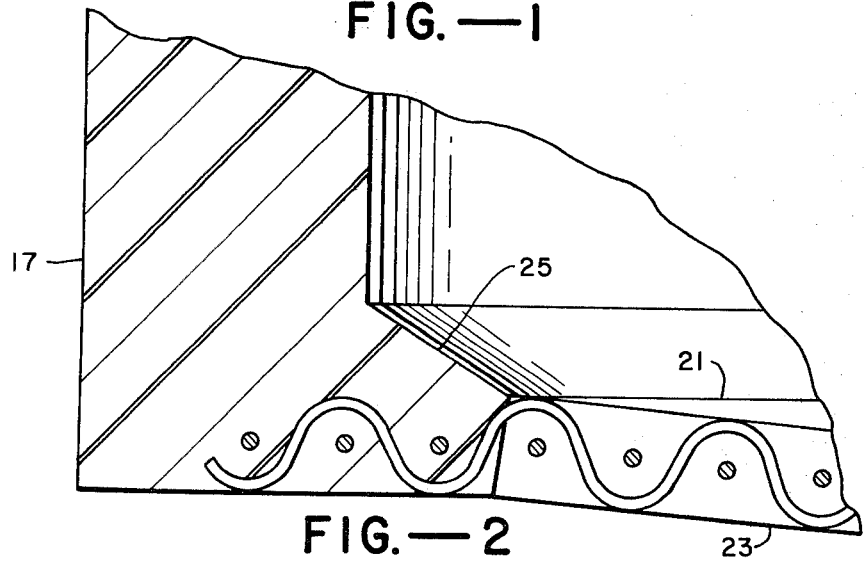
FIG.—2

STRAINER

This application is a continuation-in-part of my pending application Ser. No. 16,328, filed Feb. 27, 1979, now abandoned.

This invention relates to strainers and particularly to strainers for paints, enamels and acrylic enamels.

At the present time somewhere between seventy-five and ninety-five percent of all automobiles are painted with enamel or with acrylic enamel. While the advantages of enamels are many, they have a distinct disadvantage in that any imperfection in the applied enamel such as by grit or other particles may be removed only by sanding and refinishing after the original enamel has fully dried. With enamel it takes two to four weeks before it is sufficiently dried and seasoned to permit the resanding and for acrylic enamels the time is two days. Even so, it is obvious that any imperfections in the finished enamel are quite expensive and time consuming to remove. These problems have been recognized for many years and in the manufacture of new cars elaborate filtering and straining equipment is employed to prevent any imperfections due to dirt or other particles in the enamel. However, in the usual paint and body shop associated with automotive repair and the like such elaborate and expensive equipment is not available and in the past it has been attempted to remove the particles and dust from the enamel by the use of temporary or disposable filters. Generally speaking, these filters are of a conical shape and formed of paper with a number of openings in the apex of the cone covered by a gauze like material. After a single use the filter is discarded and a new one is utilized for the next operation. Not only is this method wasteful but also it has been substantially ineffective in removing particles from enamel and acrylic enamel.

It is a general object of the present invention to provide an improved strainer.

It is a more particular object of the invention to provide a strainer which is reusable but relatively inexpensive and simple to manufacture.

In summary the invention includes a funnel shaped body having a relatively large opening at one end and a relatively small opening at its other end. The body is formed of a poreless polypropylene. A stainless steel screen having a mesh of between 145 and 230 is bonded to the body and extended across the relatively small opening. The screen is slightly larger than the opening whereby the screen is free to flex.

Referring to the drawing

FIG. 1 is a cross sectional view of a paint strainer in accordance with the invention, and FIG. 2 is a detailed cross sectional view taken along the line 2—2 of FIG. 1.

Referring to the drawing, there is shown a funnel shaped body 11 having an upper frusto-conical section 13, a central section 15 which is also frusto-conical but has a larger vertex angle than the section 13. At the bottom of the body is a generally cylindrical section 17. The body then is generally funnel shaped having a relatively large opening 19 at its upper end and a relatively small opening 21 at its lower end.

The cylindrical section 17 is adapted to fit within the opening 20 of an open top container 22 which receives the strained paint. For ease of insertion and also to require as little of the filter as necessary to actually be held within the container 22, it has been found that the external diameter of the cylindrical section 17 should be from 70% to 90% and ideally 80% of the diameter of the opening 20. For stability, particularly while pouring paint into the filter, the external diameter of the cylindrical section 17 should be from 40% to 60%, and ideally 50%, of the largest outside diameter of the upper frusto-conical section 13. Also, the length of the cylindrical section 17 should be from 15% to 35%, ideally 25%, of its outside diameter. This not only lends further stability to the strainer but also defines the limit of the strainer's insertion into the container 22 such that paint can be poured into the strainer until such time that its level in the container just rises above the bottom of the strainer. Thus, even though the level of paint in the container itself cannot be seen, the amount of paint to be poured can be determined without removing the strainer merely by noting when the paint level begins to rise in the strainer itself.

It has also been found that the angle of the frusto-conical sections 13 and 15 is important to the stability of the filter in the container. Thus, the angle between the longitudinal axis of the filter and the side of the frusto-conical section 15 should be from 35° to 55° with 45° being ideal; the angle between the longitudinal axis and the side of the frusto-conical section 13 should be from 0° (parallel) to 20° with 10° being ideal.

The body is formed of a non-stick material which is insoluble in paint thinner or paint remover. Such a material is poreless polypropylene which prevents the adhesion of paint thereto. To further prevent this adhesion the interior surface of the body 11 is finished smoothly. Preferably the body 11 is injection molded. A screen 23 is bonded across the opening 21 at the lowermost portion of the filter. By placing the screen at the lowermost portion of the filter, cleaning is facilitated. It can be seen that the filter can easily be cleaned in a receptacle having only a small amount of solvent (for instance a depth of ¼ inch) rather than it being necessary to immerse the entire filter or a major portion of it.

The screen 23 is formed of stainless steel wire, preferably with a finish of 18% chromium and 8% nickel. This again is to prevent the adhesion of paint. It has been found that a screen having a mesh of between 145 to 230 is satisfactory any mesh finer than 230 being too small to permit the necessary particles of metallic enamel paints to pass therethrough. Screens having a mesh larger than 145 permit too many particles to pass thereby preventing an adequate paint application.

The screen 23 is made somewhat larger than the opening 21 such that the screen is free to flex rather than being taut. This flexure permits the paint to pass by gravity down through the center of the screen rather than accumulating in pools at the periphery thereof. Preferably the screen should be permitted to flex at its center about one-eighth of an inch from the plane described by its annular periphery. Also to prevent the accumulation of the paint at the periphery, it will be noted, particularly in FIG. 2, that the generally cylindrical section 17 terminates with an angular rib 25 having a tapered cross section, the taper narrowing inwardly.

The screen 23 is bonded to body 11 by means of heat and pressure and it has been found that a screen having a wire diameter no greater than 0.0025 inches is required such that the heat requirements for bonding are sufficiently minimal to avoid warping the polypropylene body 11. While a wire mesh of between 145 and 230 is acceptable it has been found that an ideal mesh is a wire screen having a 200 mesh with the wire diameter being 0.0016 inches having a mesh opening of 0.0034 inches with an overall open area of 46.2%. Such a screen gives ideal straining of the paint while at the same time permitting relatively rapid flow of the paint through the screen.

While the invention has been described with reference to a strainer for paint, it should be recognized that such a strainer could well be used for other purposes. For instance, it could be used for straining cooking oil or for still other household and industrial purposes. Depending upon the end use the screen could be formed of materials other than stainless steel, such as copper, aluminum, brass, silk, polyester or glass.

What is claimed is:

1. A unitary strainer adapted to be disposed within the opening of an open top container which container is adapted to receive strained material, said strainer comprising a funnel shaped body having a relatively large opening at one end and a relatively small opening at its other end, a screen having a mesh of between 145 and 230 integrally bonded to said body and extending entirely across the relatively small opening of said body, the overall dimensions of said screen extending across the relatively small opening of the said body being slightly larger than the dimension of said opening itself whereby the screen is free to flex, said funnel shaped body including a first frusto-conical section at its one end, a cylindrical section at its other end and a second frusto-conical section intermediate its two ends, said cylindrical section having an outside diameter of between 70% and 90% of the diameter of the opening of said container, outside diameter of said cylindrical section being between 40% and 60% of the largest outside diameter of said first frusto-conical section.

2. A strainer as defined in claim 1 wherein the length of said cylindrical section is between 15% and 35% of its outside diameter.

3. A strainer as defined in claim 1 wherein the angle between the longitudinal axis of said body and the sides of said first frusto-conical section is from 0° to 20° and the angle between said axis and the side of said second frusto-conical section is from 35° to 55°.

4. A strainer as defined in claim 3 wherein said body is formed of poreless propylene and said screen is formed of stainless steel wire.

5. A strainer as defined in claim 4 wherein said body has a smooth finish.

6. A strainer as defined in claim 4 wherein said stainless steel wire has a maximum diameter of 0.0025 inches.

7. A strainer as defined in claim 4 wherein said funnel shaped body includes an annular internal rib adjacent and bonded to said screen, said rib having an inwardly narrowing tapered cross section.

8. A strainer as defined in claim 1 wherein said screen is formed of wire having a mesh of 200.

* * * * *